US009128392B2

(12) United States Patent
Wu

(10) Patent No.: US 9,128,392 B2
(45) Date of Patent: *Sep. 8, 2015

(54) POLYARYLATECARBONATE CONTAINING PHOTOCONDUCTORS

(71) Applicant: Xerox Corporation, Norwalk, CT (US)

(72) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/088,363

(22) Filed: Nov. 23, 2013

(65) Prior Publication Data
US 2015/0147690 A1     May 28, 2015

(51) Int. Cl.
| G03G 5/05 | (2006.01) |
| C08G 64/06 | (2006.01) |
| C08G 64/16 | (2006.01) |
| G03G 5/147 | (2006.01) |

(52) U.S. Cl.
CPC .............. G03G 5/0564 (2013.01); C08G 64/06 (2013.01); C08G 64/1691 (2013.01); G03G 5/14756 (2013.01)

(58) Field of Classification Search
CPC .................... G03G 5/0564; G03G 5/14756
USPC .................................................. 430/96, 59.6
See application file for complete search history.

(56) References Cited

U.S. PATENT DOCUMENTS

| 7,498,108 B2 | 3/2009 | Wu et al. |
| 7,799,494 B2 | 9/2010 | Wu et al. |
| 7,811,732 B2 | 10/2010 | Wu |
| 7,897,311 B2 | 3/2011 | Wu |
| 8,785,091 B1 * | 7/2014 | Wu et al. ...................... 430/59.6 |
| 2013/0330665 A1 * | 12/2013 | Wu et al. ......................... 430/64 |
| 2015/0111136 A1 * | 4/2015 | Wu ................................. 430/56 |

FOREIGN PATENT DOCUMENTS

| GB | 2265022 A | * | 9/1993 | ............... G03G 5/05 |
| JP | 09043882 A | * | 2/1997 | ............... G03G 5/06 |
| JP | 2001290288 A | * | 10/2001 | ............... G03G 5/05 |

OTHER PUBLICATIONS

English language machine translation of JP 2001-290288 (Oct. 2001).*
English language machine translation of JP 09-043882 (Feb. 1997).*

* cited by examiner

Primary Examiner — Christopher Rodee
(74) Attorney, Agent, or Firm — Eugene O. Palazzo

(57) ABSTRACT

A photoconductor that includes, for example, a supporting substrate, an optional anticurl layer, an optional ground plane layer, an optional hole blocking layer, an optional adhesive layer, a photogenerating layer, a charge transport layer, and an optional protective coating, and where the photogenerating layer contains a polyarylatecarbonate.

22 Claims, 1 Drawing Sheet

POLYARYLATECARBONATE CONTAINING PHOTOCONDUCTORS

Disclosed herein are photoconductors comprised of a photogenerating layer that includes a polyarylatecarbonate.

BACKGROUND

Photoconductors that include certain photogenerating layers and specific charge transport layers are known. While these photoconductors may be useful for xerographic imaging and printing systems, a number of them have a tendency to deteriorate, and thus have to be replaced at considerable costs and with extensive resources. Also, a number of known photoconductors have a minimum of, or lack of, resistance to abrasion from dust, charging rolls, toner, and carrier. For example, the surface layers of photoconductors are subject to scratches, which decrease their lifetime, and in xerographic imaging systems adversely affect the quality of the developed images. Although used photoconductor components may be partially recycled, there continues to be added costs and potential environmental hazards when recycling. Moreover, various known photoconductors possess a combination of electrical characteristics which can be improved upon, such as improved $V_r$ cycle up, and low dark decay properties where the Vr residual potential can increase with electrical cycling.

Thus, there is a need for photoconductors that substantially avoid or minimize the disadvantages of a number of known photoconductors.

Also, there is a need for photoconductors with extended lifetimes, reduced wearing characteristics, excellent electrical properties inclusive of high light sensitivity; stable electrical properties; low background properties; consistent $V_r$, residual potentials, that is substantially flat or no change in $V_r$, cycle up over a number of imaging cycles as illustrated by the generation of known PIDC (Photoinduced Discharge Curves), and the like, and where Vr cycle up refers to minimal residual potential increases with electrical cycling.

Further, there is a need for belt photoconductors that can be selected for high speed xerographic copying machines and printers.

There is also a need for light shock and ghost resistant photoconductors with excellent or acceptable mechanical characteristics, especially in xerographic systems where biased charging rolls (BCR) are used.

Moreover, there is a need for abrasion resistant or abrasion free, and scratch resistant or scratch free photoconductive surface layers.

Photoconductors with excellent cyclic characteristics and stable electrical properties, stable long term cycling, minimal charge deficient spots (CDS), and acceptable lateral charge migration (LCM) characteristics are also desirable needs.

Also, there is a need for photoconductors where there is prevented or minimized the oxidation of the charge transport compounds present in the charge transport layer by nitrous oxide ($NO_x$) originating from xerographic corotron or xerographic scorotron devices.

Another need relates to the provision of photoconductors which simultaneously exhibit excellent photoinduced discharge characteristics, excellent charge/discharge cycling stability characteristics, and improved bias charge roll (BCR) wear resistance in xerographic imaging and printing systems.

These and other needs are believed to be achievable with the photoconductors disclosed herein.

SUMMARY

Disclosed is a photoconductor comprising a photogenerating layer containing a polyarylatecarbonate.

Also disclosed is a photoconductor comprising a photogenerating layer containing a polyarylatecarbonate, and further including a supporting substrate, and a charge transport layer comprised of a charge transport component, and a polyarylatecarbonate.

Further disclosed is a photoconductor comprised in sequence of a supporting substrate, an optional anticurl layer, an optional ground plane layer, a hole blocking layer thereover, an adhesive layer, a photogenerating layer comprising a mixture of a titanyl phthalocyanine photogenerating pigment and a polyarylatecarbonate as represented by the following formulas/structures, and a charge transport layer comprised of a mixture of an aryl amine hole transport compound and an optional polyarylatecarbonate as represented by the following formula/structure

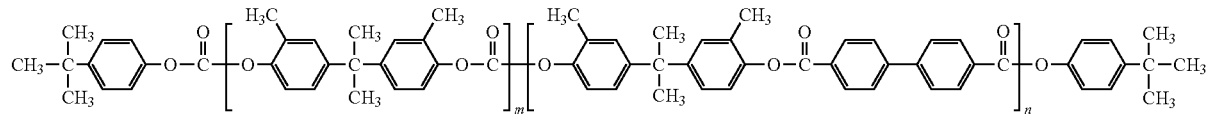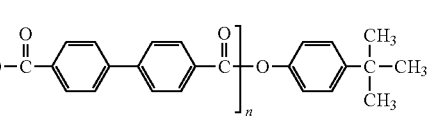

wherein m and n represent the mol percents of each segment, and wherein the total thereof is about mol 100 percent.

Moreover, disclosed is a photoconductor comprising a supporting substrate, a hole blocking layer thereover, an adhesive layer, a photogenerating layer comprised of a mixture of a titanyl phthalocyanine photogenerating pigment and a polyarylatecarbonate, and a hole transport layer comprised of a mixture of a hole transport compound and a polyarylatecarbonate.

FIGURES

There are provided the following Figures to further illustrate the photoconductors disclosed herein.

EMBODIMENTS

Figure 1:
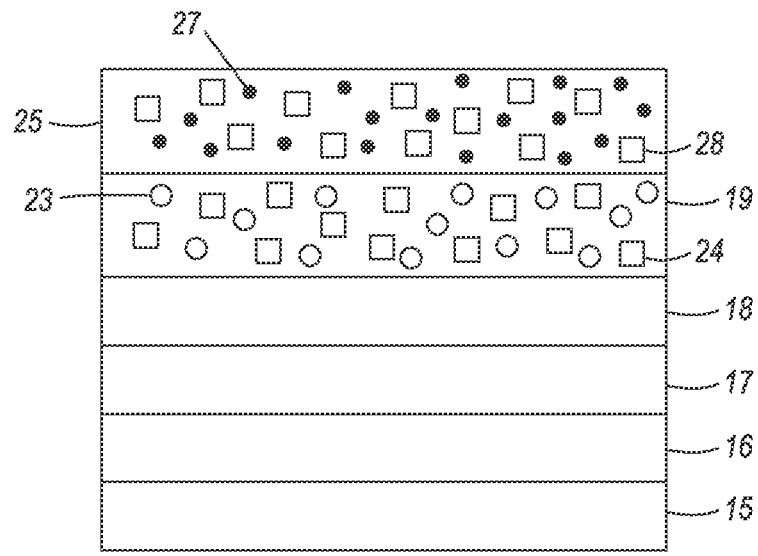
FIG. 1 illustrates an exemplary embodiment of a layered photoconductor of the present disclosure.
Figure 2:
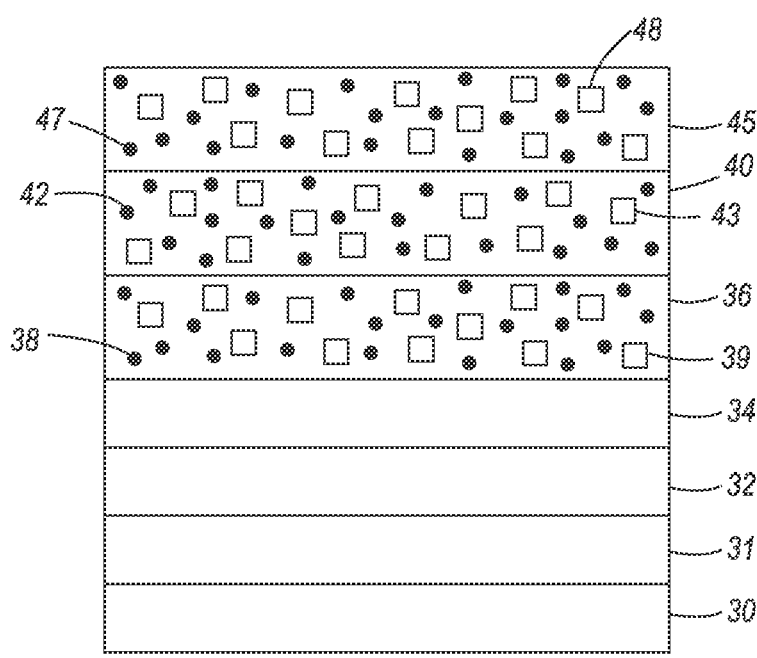
FIG. 2 illustrates another exemplary embodiment of a layered photoconductor of the present disclosure.

Exemplary and non-limiting examples of photoconductors according to embodiments of the present disclosure are depicted in FIGS. 1 and 2.

In FIG. 1, there is illustrated a photoconductor comprising an optional supporting substrate layer 15, an optional ground plane layer 16, an optional hole blocking layer 17, an optional adhesive layer 18, a photogenerating layer 19 containing photogenerating pigments 23, and polyarylatecarbonates 24, and a charge transport 25 containing charge transport compounds 27, and polyarylatecarbonates 28.

In FIG. 2, there is illustrated a photoconductor comprising an optional supporting substrate layer 30, an optional ground plane layer 31, an optional hole blocking layer 32, an optional adhesive layer 34, a photogenerating layer 36 containing a mixture of inorganic or organic photogenerating pigments 38, and polyarylatecarbonates 39, a charge transport layer 40 containing charge transport compounds 42 and polyarylatecarbonates 43, and an optional second charge transport layer 45 containing charge transport compounds 47, and polyarylatecarbonates 48, and where the second charge transport layer 45 can also function as a protective top coating layer.

Polyarylatecarbonates

Various polyarylatecarbonates can be selected for inclusion in the photoconductor photogenerating layer and optionally in the charge transport layer or layers of the present disclosure. Examples of polyarylatecarbonates selected for the photogenerating layer, and also as a component for the charge transport layer and which polyarylatecarbonates are obtainable from Mitsubishi Gas Chemical Company, Inc. are represented by at least one of the following formulas/structures and mixtures thereof

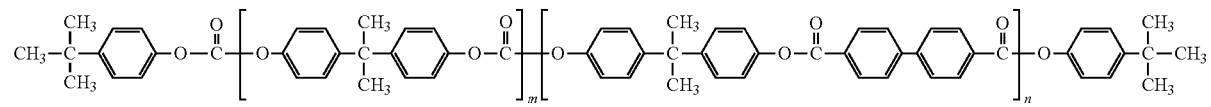

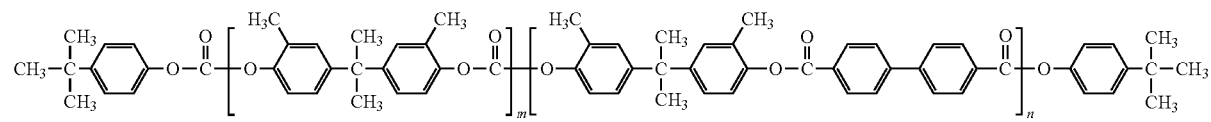

and

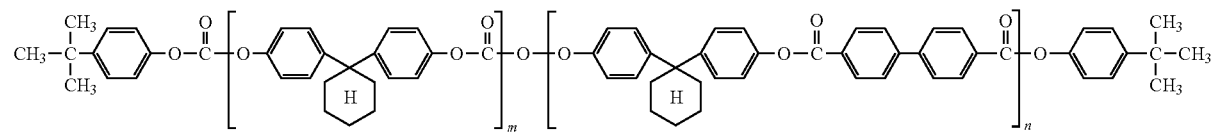

wherein m and n are the mol percents of each segment, respectively, as measured by known methods, and more specifically, by NMR, with m being, for example, from about 60 to about 99 mol percent, from about 60 to about 95 mol percent, from about 70 to about 90 mol percent, from about 75 to about 85 mol percent, from about 65 to about 85 mol percent, or from about 80 mol percent to about 85 mol percent; n being, for example, from about 1 to about 40 mol percent, from about 10 to about 30 mol percent, from about 15 to about 35 mol percent, from about 15 to about 25 mole percent, or from about 15 to about 20 mol percent with the total of m and n being equal to about 100 mol percent.

Specific examples of polyarylatecarbonate copolymers selected for the disclosed photoconductors, prepared by and obtainable from Mitsubishi Gas Chemical Company, Inc., and comprising a biphenyl moiety are represented by the following formulas/structures wherein m and n are the mol percents as disclosed herein, and yet more specifically, wherein m and n are as illustrated below, and wherein the viscosity average molecular weight ($M_v$) was provided by Mitsubishi Gas Chemical Company, Inc., and which viscosity average molecular weight may be determined by known viscosity measurement processes.

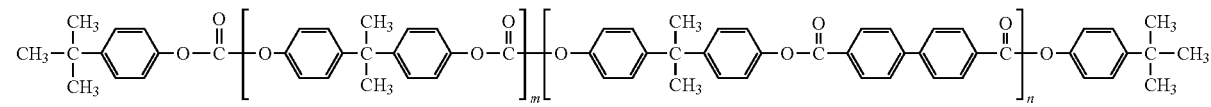

wherein m is from about 75 to about 85 mole percent, and n is from about 15 to about 25 mol percent, with the total of m and n being equal to about 100 mol percent, and more specifically, where m is equal to about 80 mol percent, and n is equal to about 20 mol percent, with the total of m and n being equal to about 100 mol percent, and with the viscosity average molecular weight being equal to about 57,200.

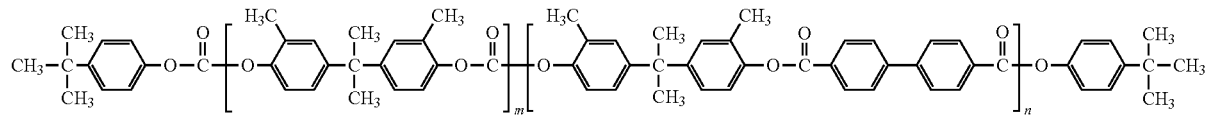

PAC-C80BP20 wherein m is from about 75 to about 85 mole percent, and n is from about 15 to about 25 mol percent, with the total of m and n being equal to about 100 percent; or wherein m is from about 65 to about 85 mol percent, n is from about 15 to about 35 mol percent with the total of m and n being equal to about 100 mol percent; and more specifically, where m is equal to about 80 mol percent and n is equal to about 20 mol percent, with the total of m and n being equal to about 100 mol percent; and with the viscosity average molecular weight being equal to about 62,600.

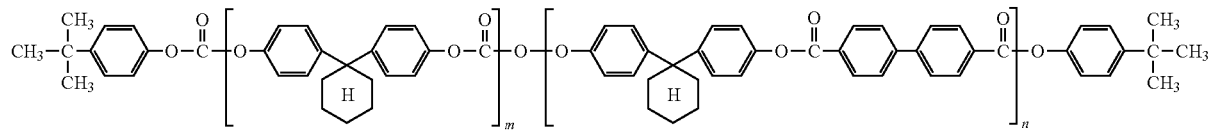

PAC-Z80BP20 wherein m is from about 75 to about 85 mole percent, and n is from about 15 to about 25 mol percent with the total of m and n being equal to about 100 mol percent, and more specifically, where m equals about 80 mol percent, n equals about 20 mol percent, with the total of m and n being equal to about 100 mol percent, and with the viscosity average molecular weight being equal to about 46,600, and mixtures thereof.

The polyarylatecarbonates, such as the copolymers thereof, possess, for example, a weight average molecular weight of from about 40,000 to about 80,000, from about 45,000 to about 70,000, from about 40,000 to about 70,000, or from about 50,000 to about 60,000 as determined by GPC analysis, and a number average molecular weight of from about 30,000 to about 65,000, from about 30,000 to about 60,000, from about 35,000 to about 60,000, or from about 40,000 to about 50,000 as determined by GPC analysis.

Photoconductor Layer Examples

A number of known components can be selected for the various photoconductor layers, such as the supporting substrate layer, the photogenerating layer, the charge transport layer mixture, the ground plane layer when present, the hole blocking layer when present, the adhesive layer when present, and an optional protective top layer, such as a polymer containing top layer.

Supporting Substrates

The thickness of the photoconductor supporting substrate layer depends on many factors, including the strength desired, economical considerations, the electrical characteristics desired, adequate flexibility properties, availability, and the cost of the specific components for each layer, and the like, thus this layer may be of a substantial thickness, for example about 2,500 microns, such as from about 100 to about 2,000 microns, from about 400 to about 1,000 microns, from about 250 to about 675 microns, or from about 200 to about 600 microns ("about" throughout includes all values in between the values recited), or of a minimum thickness, such as about 50 microns. In embodiments, the thickness of the supporting substrate layer is from about 70 to about 300 microns, or from about 100 to about 175 microns. The thickness of the substrate layer depends on numerous factors, including strength desired, and economical considerations.

The photoconductor supporting substrate may be opaque or substantially transparent, and may comprise any suitable material including known or future developed materials. Accordingly, the substrate may comprise a layer of an electrically nonconductive or conductive material, such as an inorganic or an organic composition. As electrically nonconducting materials, there may be employed various resins known for this purpose including polyesters, polycarbonates, polyamides, polyurethanes, and the like, which are flexible as thin webs. An electrically conducting substrate may be any suitable metal of, for example, aluminum, nickel, steel, copper, gold, and the like, or a polymeric material, as described above, filled with an electrically conducting substance, such as carbon, metallic powder, and the like, or an organic electrically conducting material. The electrically insulating or conductive substrate may be in the form of an endless flexible belt, a web, a rigid cylinder, a sheet, and the like.

In embodiments where the substrate layer is not conductive, the surface thereof may be rendered electrically conductive by an electrically conductive coating, such as a suitable metal or metal oxide. The conductive coating may vary in thickness over substantially wide ranges depending upon the optical transparency, degree of flexibility desired, and economic factors.

Illustrative examples of substrates are as illustrated herein, and more specifically, supporting substrate layers selected for the photoconductors of the present disclosure, and which substrates can be opaque or substantially transparent comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass, or the like. The substrate may be flexible, seamless, or rigid, and may have a number of many different configurations, such as for example, a plate, a cylindrical drum, a scroll, an endless flexible belt, and the like. In embodiments, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

Anticurl Layer

In some situations, it may be desirable to coat an anticurl layer on the back of the photoconductor substrate, particularly when the substrate is a flexible organic polymeric material. This anticurl layer, which is sometimes referred to as an anticurl backing layer, minimizes undesirable curling of the substrate. Suitable materials selected for the disclosed photoconductor anticurl layer include, for example, polycarbonates commercially available as MAKROLON®, polyesters, and the like. The anticurl layer can be of a thickness of from about 5 to about 40 microns, from about 10 to about 30 microns, or from about 15 to about 25 microns.

Ground Plane Layer

Positioned on the top side of the supporting substrate, there can be included an optional ground plane such as gold, gold containing compounds, aluminum, titanium, titanium/zirconium, and other suitable known components. The thickness of the ground plane layer can be from about 10 to about 100 nanometers, from about 20 to about 50 nanometers, from about 10 to about 30 nanometers, from about 15 to about 25 nanometers, or from about 20 to about 35 nanometers.

Hole-Blocking Layer

An optional charge blocking layer or hole blocking layer may be applied to the photoconductor supporting substrate, such as to an electrically conductive supporting substrate surface prior to the application of a photogenerating layer. An optional charge blocking layer or hole blocking layer, when present, is usually in contact with the ground plane layer, and also can be in contact with the supporting substrate. The hole blocking layer generally comprises any of a number of known components as illustrated herein, such as metal oxides, phenolic resins, aminosilanes, and the like, and mixtures thereof. The hole blocking layer can have a thickness of from about 0.01 to about 30 microns, from about 0.02 to about 5 microns, or from about 0.03 to about 2 microns.

Examples of aminosilanes included in the hole blocking layer can be represented by the following formula/structure

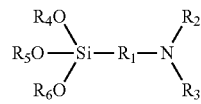

wherein $R_1$ is alkylene, straight chain, or branched containing, for example, from 1 to about 25 carbon atoms, from 1 to about 18 carbon atoms, from 1 to about 12 carbon atoms, or from 1 to about 6 carbon atoms; $R_2$ and $R_3$ are, for example, independently selected from the group consisting of at least one of a hydrogen atom, alkyl containing, for example, from 1 to about 12 carbon atoms, from 1 to about 10 carbon atoms, or from 1 to about 4 carbon atoms; aryl containing, for example, from about 6 to about 24 carbon atoms, from about 6 to about 18 carbon atoms, or from about 6 to about 12 carbon atoms, such as a phenyl group, and a poly(alkylene amino) group, such as a poly(ethylene amino) group, and where $R_4$, $R_5$ and $R_6$ are independently an alkyl group containing, for example, from 1 to about 12 carbon atoms, from 1 to about 10 carbon atoms, or from 1 to about 4 carbon atoms.

Specific examples of suitable hole blocking layer aminosilanes include 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, N-2-aminoethyl-3-aminopropyl tris(ethylethoxy)silane, p-aminophenyl trimethoxysilane, N,N'-dimethyl-3-aminopropyl triethoxysilane, 3-aminopropylmethyl diethoxysilane, 3-aminopropyl trimethoxysilane, N-methylaminopropyl triethoxysilane, methyl[2-(3-trimethoxysilylpropylamino)ethylamino]-3-proprionate, (N,N'-dimethyl 3-amino)propyl triethoxysilane, N,N-dimethylaminophenyl triethoxysilane, trimethoxysilyl propyldiethylene triamine, and the like, and mixtures thereof. Specific aminosilanes incorporated into the hole blocking layer are 3-aminopropyl triethoxysilane (γ-APS), N-aminoethyl-3-aminopropyl trimethoxysilane, (N,N'-dimethyl-3-amino)propyl triethoxysilane, or mixtures thereof.

The hole blocking layer aminosilane may be treated to form a hydrolyzed silane solution before being added into the final hole blocking layer coating solution or dispersion. During hydrolysis of the aminosilanes, the hydrolyzable groups, such as the alkoxy groups, are replaced with hydroxyl groups. The pH of the hydrolyzed silane solution can be controlled to from about 4 to about 10, or from about 7 to about 8 to thereby result in photoconductor electrical stability. Control of the pH of the hydrolyzed silane solution may be affected with any suitable material, such as generally organic acids or inorganic acids. Examples of organic and inorganic acids selected for pH control include acetic acid, citric acid, formic acid, hydrogen iodide, phosphoric acid, hydrofluorosilicic acid, p-toluene sulfonic acid, and the like.

The hole blocking layer can, in embodiments, be prepared by a number of known methods, the process parameters being dependent, for example, on the photoconductor member desired. The hole blocking layer can be coated as a solution or a dispersion onto the photoconductor supporting substrate, or on to the ground plane layer by the use of a spray coater, a dip coater, an extrusion coater, a roller coater, a wire-bar coater, a slot coater, a doctor blade coater, a gravure coater, and the like, and dried at, for example, from about 40 to about 200° C. or from 75 to 150° C. for a suitable period of time, such as for example, from about 1 to about 4 hours, from about 1 to about 10 hours, or from about 40 to about 100 minutes in the presence of an air flow. The hole blocking layer coating can be accomplished in a manner to provide a final hole blocking layer thickness after drying of, for example, from about 0.01 to about 30 microns, from about 0.02 to about 5 microns, or from about 0.03 to about 2 microns.

Adhesive Layer

An optional adhesive layer may be included which layer is usually situated between the photoconductor hole blocking layer and the photogenerating layer. Typical adhesive layer materials selected for the photoconductors illustrated herein, include polyesters, such as an ARDEL® aromatic polyester adhesive interfacial layer (IFL), polyurethanes, copolyesters, polyamides, poly(vinyl butyrals), poly(vinyl alcohols), polyacrylonitriles, and the like, and mixtures thereof. The adhesive layer thickness can be, for example, from about 0.001 to about 1 micron, from about 0.05 to about 0.5 micron, or from about 0.1 to about 0.3 micron. Optionally, the adhesive layer may contain effective suitable amounts of from about 1 to about 10 weight percent or from about 1 to about 5 weight percent of conductive particles, such as zinc oxide, titanium dioxide, silicon nitride, and carbon black, nonconductive particles, such as polyester polymers, and mixtures thereof.

Photogenerating Layer

Usually, the disclosed photoconductor photogenerating layer is applied by vacuum deposition or by spray drying onto the supporting substrate, and at least one charge transport layer, such as from 1 to about 7 layers, and 2 to about 4 layers, is formed on the photogenerating layer. The charge transport layer may be situated on the photogenerating layer, the photogenerating layer may be situated on the charge transport layer, or when more than one charge transport layer is present, they can be contained on the photogenerating layer. Also, the photogenerating layer may be applied to any of the layers that are situated between the supporting substrate and the charge transport layer.

Generally, the photogenerating layer can contain known photogenerating pigments, such as metal phthalocyanines, metal free phthalocyanines, alkylhydroxyl gallium phthalocyanines, hydroxygallium phthalocyanines, halogallium phthalocyanines, such as chlorogallium phthalocyanines, perylenes, such as bis(benzimidazo)perylene, titanyl phthalocyanines, especially Type V titanyl phthalocyanine, and the like, and mixtures thereof.

Examples of photogenerating pigments included in the photogenerating layer are vanadyl phthalocyanines, hydroxygallium phthalocyanines, such as hydroxygallium phthalocyanine Type V, Type A, B or C chlorogallium phthalocyanines, high sensitivity titanyl phthalocyanines, Type IV and V titanyl phthalocyanines, quinacridones, polycyclic pigments, such as dibromo anthanthrone pigments, perinone diamines, polynuclear aromatic quinones, azo pigments including bis-, tris- and tetrakis-azos, and the like, and other known photogenerating pigments; inorganic components, such as selenium, selenium alloys, and trigonal selenium; and pigments of crystalline selenium and its alloys.

A number of titanyl phthalocyanines, or oxytitanium phthalocyanines, can be selected as the disclosed photoconductor photogenerating pigments known to absorb near infrared light around 800 nanometers, and may exhibit improved sensitivity compared to other pigments, such as, for example, hydroxygallium phthalocyanine.

Generally, titanyl phthalocyanine is known to have five main crystal forms known as Types I, II, III, X, and IV. For example, U.S. Pat. Nos. 5,189,155 and 5,189,156, the entire disclosures of which are incorporated herein by reference, disclose a number of methods for obtaining various polymorphs of titanyl phthalocyanine. Additionally, U.S. Pat. Nos. 5,189,155 and 5,189,156 are directed to processes for obtaining Types I, X, and IV phthalocyanines. U.S. Pat. No. 5,153,094, the entire disclosure of which is incorporated herein by reference, relates to the preparation of titanyl phthalocyanine polymorphs including Types I, II, III, and IV polymorphs. U.S. Pat. No. 5,166,339, the disclosure of which is totally incorporated herein by reference, discloses processes for preparing Types I, IV, and X titanyl phthalocyanine polymorphs, as well as the preparation of two polymorphs designated as Type Z-1 and Type Z-2.

To obtain a titanyl phthalocyanine based photoreceptor having high sensitivity to near infrared light, it is believed of value to control not only the purity and chemical structure of the pigment, as is generally the situation with organic photoconductors, but also to prepare the pigment in a certain crystal modification. Consequently, it is still desirable to provide a photoconductor where the titanyl phthalocyanine is generated by a process that will provide high sensitivity titanyl phthalocyanines.

In embodiments, the Type V phthalocyanine pigment included in the photogenerating layer can be generated by dissolving Type I titanyl phthalocyanine in a solution comprising a trihaloacetic acid and an alkylene halide; adding the resulting mixture comprising the dissolved Type I titanyl phthalocyanine to a solution comprising an alcohol and an alkylene halide thereby precipitating a Type Y titanyl phthalocyanine; and treating the resulting Type Y titanyl phthalocyanine with monochlorobenzene.

With further respect to the titanyl phthalocyanines selected for the photogenerating layer, such phthalocyanines can exhibit a crystal phase that is distinguishable from other known titanyl phthalocyanine polymorphs, and which are designated as Type V polymorphs prepared by converting a Type I titanyl phthalocyanine to a Type V titanyl phthalocyanine pigment. The processes include converting a Type I titanyl phthalocyanine to an intermediate titanyl phthalocyanine, which is designated as a Type Y titanyl phthalocyanine, and then subsequently converting the Type Y titanyl phthalocyanine to a Type V titanyl phthalocyanine.

In one embodiment, the process comprises (a) dissolving a Type I titanyl phthalocyanine in a suitable solvent; (b) adding the solvent solution comprising the dissolved Type I titanyl phthalocyanine to a quenching solvent system to precipitate an intermediate titanyl phthalocyanine (designated as a Type Y titanyl phthalocyanine); and (c) treating the resultant Type Y phthalocyanine with a halo, such as, for example, monochlorobenzene to obtain a resultant high sensitivity titanyl phthalocyanine, which is designated herein as a Type V titanyl phthalocyanine. In another embodiment, prior to treating the Type Y phthalocyanine with a halo, such as monochlorobenzene, the Type Y titanyl phthalocyanine may be washed with various solvents including, for example, water, and/or methanol. The quenching solvents system to which the solution comprising the dissolved Type I titanyl phthalocyanine is added comprises, for example, an alkyl alcohol and an alkylene halide.

Also the titanyl phthalocyanine Type V prepared by a process according to the present disclosure is distinguishable from, for example, Type IV titanyl phthalocyanines in that a Type V titanyl phthalocyanine exhibits an X-ray powder diffraction spectrum having four characteristic peaks at 9.0°, 9.6°, 24.0°, and 27.2°, while Type IV titanyl phthalocyanines typically exhibits three characteristic peaks at 9.6°, 24.0°, and 27.2°.

In a process embodiment for preparing a high sensitivity phthalocyanine in accordance with the present disclosure, a Type I titanyl phthalocyanine is dissolved in a suitable solvent. In embodiments, a Type I titanyl phthalocyanine is dissolved in a solvent comprising a trihaloacetic acid and an alkylene halide. The alkylene halide comprises, in embodiments, from about one to about six carbon atoms. An example of a suitable trihaloacetic acid includes, but is not limited to, trifluoroacetic acid. In one embodiment, the solvent for dissolving a Type I titanyl phthalocyanine comprises trifluoroacetic acid and methylene chloride. In embodiments, the trihaloacetic acid is present in an amount of from about one volume part to about 100 volume parts of the solvent, and the alkylene halide is present in an amount of from about one volume part to about 100 volume parts of the solvent. In one embodiment, the solvent comprises methylene chloride and trifluoroacetic acid in a volume-to-volume ratio of about 4 to 1, and where the Type I titanyl phthalocyanine is dissolved in a solvent by stirring for an effective period of time, such as, for example, for about 30 seconds to about 24 hours, at room temperature. More specifically, the Type I titanyl phthalocyanine can be dissolved by, for example, stirring in a solvent, in either air or in an inert atmosphere (argon or nitrogen), for about one hour at room temperature (about 25° C.).

The photogenerating layer mixture can contain various effective amounts of photogenerating components, depending for example, on the photogenerating component selected, the polyarylatecarbonate or polyarylatecarbonates present, the thickness of the photogenerating layer and the like. Generally the photogenerating components are present in the photogenerating layer in an amount of, for example, from about 5 to about 95 weight percent, from about 10 to about 80 weight percent, from about 15 to about 85 weight percent, from about 20 to about 80 weight percent, from about 20 to about 70 weight percent, from about 20 to about 30 weight percent, from about 70 to about 80 weight percent, from about 25 to about 75 weight percent, from about 98 to about 99.5 weight percent, based on the solids or total ingredients present in the photogenerating layer, and wherein the sum of the photogenerating component, such as a pigment or pigments and the disclosed polyarylatecarbonate or polyarylatecarbonates equals about 100 percent. In one embodiment, about 90 percent by volume or by weight of the photogenerating component is dispersed in about 10 percent by volume or by weight of the polyarylatecarbonate.

The polyarylatecarbonate or polyarylatecarbonates are present in the photogenerating layer in an amount of, for example, from about 5 to about 95 weight percent, from about 20 to about 90 weight percent, from about 15 to about 85 weight percent, from about 20 to about 80 weight percent, from about 20 to about 70 weight percent, from about 30 to about 80 weight percent, from about 70 to about 80 weight percent, from about 20 to about 30 weight percent, from about 25 to about 75 weight percent, from about 10 to about 80 weight percent, and from about 0.5 to about 2 weight percent, based on the solids or total ingredients present in the photogenerating layer, and wherein the sum of the photogenerating component, such as a pigment or pigments and the disclosed polyarylatecarbonate or polyarylatecarbonates, equals about 100 percent.

Examples of second optional polymeric binder materials, in addition to the polyarylatecarbonates illustrated herein, and that can be selected as the matrix or binder for the disclosed photogenerating layer or for the disclosed charge transport layers include thermoplastic and thermosetting resins, such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, poly(phenylene sulfides), poly(vinyl acetate), polysiloxanes, polyacrylates, polyvinyl acetals, amino resins, phenylene oxide resins, terephthalic acid resins, phenoxy resins, epoxy resins, phenolic resins, acrylonitrile copolymers, poly(vinyl chloride), vinyl chloride and vinyl acetate copolymers, acrylate copolymers, alkyd resins, cellulosic film formers, poly(amideimide), styrene butadiene copolymers, vinylidene chloride-vinyl chloride copolymers, vinyl acetate-vinylidene chloride copolymers, styrene-alkyd resins, poly(vinyl carbazole), and the like, inclusive of block, random, or alternating copolymers thereof.

It is often desirable to select a coating solvent for the disclosed photogenerating layer mixture, and which solvent does not substantially disturb or adversely affect the previously coated layers or subsequent coating layers of the photoconductor. Examples of coating solvents used for the photogenerating layer coating mixture include ketones, alcohols, aromatic hydrocarbons, halogenated aliphatic hydrocarbons, ethers, amines, amides, esters, and the like, and mixtures thereof. Specific solvent examples selected for the photogenerating mixture are cyclohexanone, acetone, methyl ethyl ketone, methanol, ethanol, butanol, amyl alcohol, toluene, xylene, chlorobenzene, such as monochlorobenzene, carbon tetrachloride, chloroform, methylene chloride, trichloroethylene, tetrahydrofuran, dioxane, diethyl ether, dimethyl formamide (DMF), dimethyl acetamide, butyl acetate, ethyl acetate, methoxyethyl acetate, mixtures thereof, and the like.

The photogenerating layer can be of a thickness of, for example, from about 0.01 to about 10 microns, from about 0.05 to about 10 microns, from about 0.2 to about 2 microns, or from about 0.25 to about 1 micron.

Charge Transport Layer

There can be generated the disclosed charge transport layer or at least one charge transport layer, and more specifically, in embodiments, a first or bottom charge transport layer in contact with the photogenerating layer, and included over the first or bottom charge transport layer a top or second charge transport overcoating layer, comprising charge transporting compounds or molecules dissolved, or molecularly dispersed in the polyarylatecarbonates disclosed herein. In embodiments, "dissolved" refers, for example, to forming a solution in which the charge transport molecules are dissolved to form a homogeneous phase; and molecularly dispersed refers, for example, to charge transporting molecules or compounds dispersed on a molecular scale in the polyarylatecarbonates disclosed herein.

In embodiments, charge transport refers, for example, to charge transporting molecules that allow the free charges generated in the photogenerating layer to be transported across the charge transport layer. The charge transport layer is usually substantially nonabsorbing to visible light or radiation in the region of intended use, but is electrically active in that it allows the injection of photogenerated holes from the photoconductive layer, or photogenerating layer, and permits these holes to be transported to selectively discharge surface charges present on the surface of the photoconductor.

A number of charge transport compounds can be included in the polyarylatecarbonate charge transport layer mixture or in at least one charge transport layer mixture where at least one charge transport layer is, for example, from 1 to about 5 layers, from 1 to about 3 layers, 2 layers, or 1 layer. Examples of charge transport components or compounds present in an amount of, for example, from about 15 to about 50 weight percent, from about 35 to about 45 weight percent, or from about 40 to about 45 weight percent based on the total solids of the at least one charge transport layer are the compounds as illustrated in Xerox Corporation U.S. Pat. No. 7,166,397, the disclosure of which is totally incorporated herein by reference, and more specifically, aryl amine compounds or molecules selected from the group consisting of those represented by the following formulas/structures

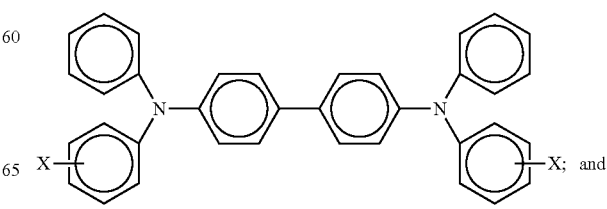

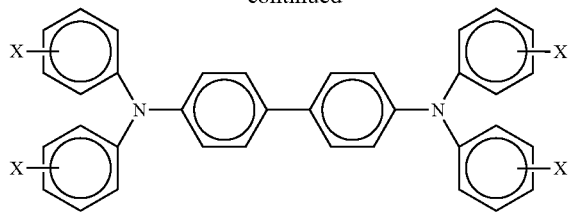

wherein X is a suitable hydrocarbon like alkyl, alkoxy, aryl, isomers thereof, and derivatives thereof like alkylaryl, alkoxyaryl, arylalkyl; a halogen, or mixtures of a suitable hydrocarbon and a halogen; and charge transport layer compounds as represented by the following formula/structure

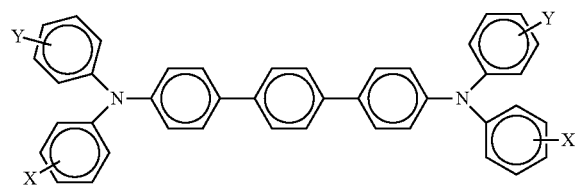

wherein X and Y are independently alkyl, alkoxy, aryl, a halogen, or mixtures thereof.

Alkyl and alkoxy for the photoconductor charge transport layer compounds illustrated herein contain, for example, from about 1 to about 25 carbon atoms, from about 1 to about 12 carbon atoms, or from about 1 to about 6 carbon atoms, such as methyl, ethyl, propyl, butyl, pentyl, hexyl, heptyl, octyl, nonyl, decyl, undecyl, dodecyl, pentadecyl, and the like, and the corresponding alkoxides. Aryl substituents for the charge transport layer compounds can contain from 6 to about 36, from 6 to about 24, from 6 to about 18, or from 6 to about 12 carbon atoms, such as phenyl, naphthyl, anthryl, and the like. Halogen substituents for the charge transport layer compounds include chloride, bromide, iodide, and fluoride. Substituted alkyls, substituted alkoxys, and substituted aryls can also be selected for the disclosed charge transport layer compounds.

Examples of specific aryl amines present in at least one photoconductor charge transport layer include N,N,N',N'-tetra-p-tolyl-1,1'-biphenyl-4,4'-diamine, N,N'-diphenyl-N,N'-bis(alkylphenyl)-1,1'-biphenyl-4,4'-diamine, wherein alkyl is selected from the group consisting of methyl, ethyl, propyl, butyl, hexyl, heptyl, octyl, nonyl, decyl, undecyl, dodecyl, pentadecyl, and the like, N,N'-diphenyl-N,N'-bis(halophenyl)-1,1'-biphenyl-4,4'-diamine wherein the halo substituent is chloro, N,N'-bis(4-butylphenyl)-N,N'-di-p-tolyl-[p-terphenyl]-4,4'-diamine, N,N'-bis(4-butylphenyl)-N,N'-di-m-tolyl-[p-terphenyl]-4,4'-diamine, N,N'-bis(4-butylphenyl)-N,N'-di-o-tolyl-[p-terphenyl]-4,4'-diamine, N,N'-bis(4-butylphenyl)-N,N'-bis-(4-isopropylphenyl)-[p-terphenyl]-4,4'-diamine, N,N'-bis(4-butylphenyl)-N,N'-bis-(2-ethyl-6-methylphenyl)-[p-terphenyl]-4,4'-diamine, N,N'-bis(4-butylphenyl)-N,N'-bis-(2,5-dimethylphenyl)-[p-terphenyl]-4,4'-diamine, N,N'-diphenyl-N,N'-bis(3-chlorophenyl)-[p-terphenyl]-4,4'-diamine, and the like, hydrazones such as N-phenyl-N-methyl-3-(9-ethyl)carbazyl hydrazone and 4-diethyl amino benzaldehyde-1,2-diphenyl hydrazine, or oxadiazoles, such as 2,5-bis(4-N,N'-diethylaminophenyl)-1,2,4-oxadiazole, stilbenes, and the like.

Various processes may be used to mix, and thereafter apply the charge transport layer or layers coating mixture to the photogenerating layer. Typical charge transport layer application techniques include spraying, dip coating, roll coating, wire wound rod coating, and the like. Drying of the deposited charge transport layer coating or plurality of coatings may be affected by any suitable conventional technique such as oven drying, infrared radiation drying, air drying, and the like.

The thickness of the at least one charge transport layer is, for example, from about 5 to about 80 microns, from about 20 to about 65 microns, from about 15 to about 50 microns, or from about 10 to about 40 microns, but thicknesses outside these ranges may, in embodiments, also be selected. The charge transport layer should be an insulator to the extent that an electrostatic charge placed on the charge transport layer is not conducted in the absence of illumination at a rate sufficient to prevent formation and retention of an electrostatic latent image thereon. In general, the ratio of the thickness of the charge transport layer to the photogenerating layer can be from about 2:1 to 200:1, and in some instances about 400:1.

Examples of optional second binders that, for example, can permit enhanced miscibility of the charge transport component and selected for the disclosed photoconductor charge transport layers, include polycarbonates, polyarylates, acrylate polymers, vinyl polymers, cellulose polymers, polyesters, polysiloxanes, polyamides, polyurethanes, poly(cyclo olefins), epoxies, and random or alternating copolymers thereof, and more specifically, polycarbonates such as poly (4,4'-isopropylidene-diphenylene) carbonate (also referred to as bisphenol-A-polycarbonate), poly(4,4'-cyclohexylidine diphenylene) carbonate (also referred to as bisphenol-Z-polycarbonate), poly(4,4'-isopropylidene-3,3'-dimethyl-diphenyl) carbonate (also referred to as bisphenol-C-polycarbonate), and the like. In embodiments, electrically inactive optional resin binders are comprised of polycarbonate resins with a weight average molecular weight of from about 20,000 to about 100,000, or with a weight average molecular weight $M_w$ of from about 50,000 to about 100,000.

In embodiments, a charge transport compound can be represented by the following formulas/structures

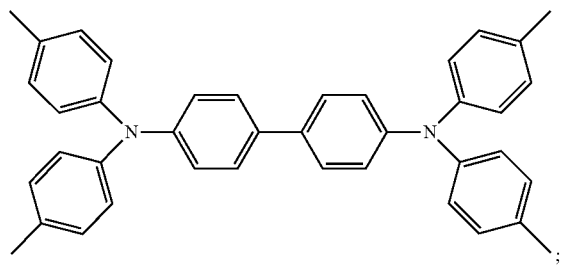

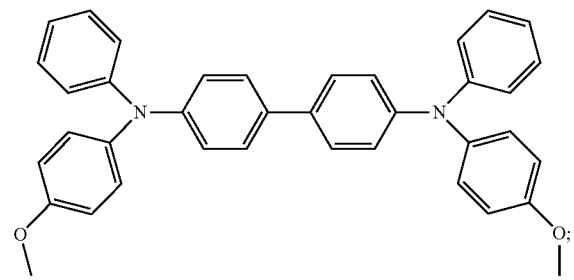

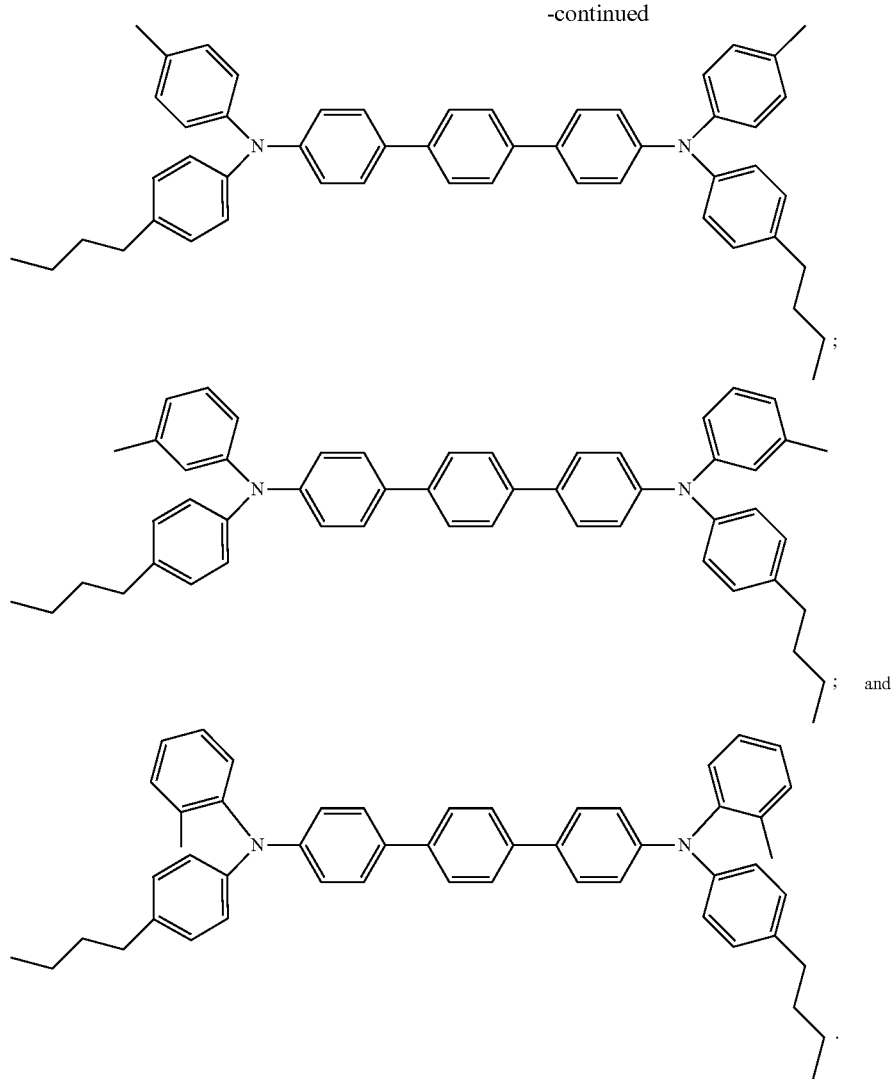

In the charge transport layer mixture, the polyarylatecarbonates illustrated herein can be present in a number of effective amounts, such as for example, from about 25 to about 90 weight percent, from about 40 to about 85 weight percent, from about 45 to about 80 weight percent, from about 50 to about 75 weight percent, from about 50 to about 70 weight percent, from about 50 to about 65 weight percent, from about 30 to about 80 weight percent, from about 30 to about 60 weight percent, from about 20 to about 70 weight percent, and yet more specifically, about 60 weight percent based on the total solids, and where the total of components present in at least one charge transport layer is equal to about 100 percent.

Thus the at least one transport layer contains, for example, from about 10 to about 75 percent by weight of the charge transport component, from about 15 to about 60 weight percent of the charge transport component, from about 20 to about 55 weight percent of the charge transport component, from about 25 to about 50 weight percent of the charge transport component, from about 30 to about 50 weight percent of the charge transport component, from about 20 to about 70 weight percent of the charge transport component, from about 40 to about 70 weight percent of the charge transport component, from about 35 to about 50 weight percent of the charge transport component, from about 20 to about 55 weight percent of the charge transport component, from about 30 to about 80 weight percent of the charge transport component, and yet more specifically, about 60 weight percent of the charge transport component based on the total solids, and where the total of components of solids present in the at least one charge transport layer is equal to about 100 percent.

Examples of components or materials optionally incorporated into at least one charge transport layer to, for example, enable excellent lateral charge migration (LCM) resistance include hindered phenolic antioxidants, such as tetrakis methylene(3,5-di-tert-butyl-4-hydroxy hydrocinnamate) methane (IRGANOX™ 1010, available from Ciba Specialty Chemical), butylated hydroxytoluene (BHT), and other hindered phenolic antioxidants including SUMILIZER™ BHT-R, MDP-S, BBM-S, WX-R, NW, BP-76, BP-101, GA-80, GM and GS (available from Sumitomo Chemical Co., Ltd.), IRGANOX™ 1035, 1076, 1098, 1135, 1141, 1222, 1330, 1425WL, 1520L, 245, 259, 3114, 3790, 5057 and 565 (available from Ciba Specialties Chemicals), and ADEKA STAB™ AO-20, AO-30, AO-40, AO-50, AO-60, AO-70, AO-80 and AO-330 (available from Asahi Denka Co., Ltd.);

hindered amine antioxidants such as SANOL™ LS-2626, LS-765, LS-770 and LS-744 (available from SNKYO CO., Ltd.), TINUVIN™ 144 and 622LD (available from Ciba Specialties Chemicals), MARK™ LA57, LA67, LA62, LA68 and LA63 (available from Asahi Denka Co., Ltd.), and SUMILIZER™ TPS (available from Sumitomo Chemical Co., Ltd.); thioether antioxidants such as SUMILIZER™ TP-D (available from Sumitomo Chemical Co., Ltd); phosphite antioxidants such as MARK™ 2112, PEP-8, PEP-24G, PEP-36, 329K and HP-10 (available from Asahi Denka Co., Ltd.); other molecules such as bis(4-diethylamino-2-methylphenyl)phenylmethane (BDETPM), bis-[2-methyl-4-(N-2-hydroxyethyl-N-ethyl-aminophenyl)]phenylmethane (DHTPM), and the like. The weight percent of the antioxidant in at least one of the charge transport layers is from about 0 to about 20 weight percent, from about 1 to about 10 weight percent, or from about 3 to about 8 weight percent.

Also included within the scope of the present disclosure are methods of imaging and printing with the photoconductor devices illustrated herein. These methods generally involve the formation of an electrostatic latent image on the imaging member, followed by developing the image with a toner composition comprised, for example, of a thermoplastic resin, a colorant, such as a pigment, dye, or mixtures thereof, a charge additive, internal additives like waxes, and surface additives, such as for example silica, coated silicas, aminosilanes, and the like, reference U.S. Pat. Nos. 4,560,635 and 4,338,390, the disclosures of each of these patents being totally incorporated herein by reference, subsequently transferring the toner image to a suitable image receiving substrate, and permanently affixing the image thereto. In those environments wherein the photoconductor is to be used in a printing mode, the imaging method involves the same operation with the exception that exposure can be accomplished with a laser device or image bar. More specifically, the flexible photoconductor belts disclosed herein can be selected for the Xerox Corporation iGEN® machines that generate with some versions over 110 copies per minute. Processes of imaging, especially xerographic imaging and printing, including digital and/or color printing, are thus encompassed by the present disclosure.

The imaging members or photoconductors illustrated herein are, in embodiments, sensitive in the wavelength region of, for example, from about 400 to about 900 nanometers, and in particular from about 650 to about 850 nanometers, thus diode lasers can be selected as the light source. Moreover, the imaging members of this disclosure are useful in color xerographic applications, particularly high-speed, for example at least 100 copies per minute, color copying and printing processes.

The photoconductor wear rates, when selecting for the photogenerating layer containing the polyarylatecarbonates illustrated herein, are, for example, reduced by from about 20 to about 70 percent, and more specifically, from about 25 to about 50 weight percent as compared to a similar known photoconductor that is free of the photogenerating layer polyarylatecarbonate. Thus, the polyarylatecarbonate containing photoconductor wear rate, measured using an in house known wear fixture (BCR system, peak-to-peak voltage=1.8 kV) is, for example, from about 30 to about 55 nanometers/kilocycle, from about 40 to about 55 nanometers/kilocycle, or from about 35 to about 50 nanometers/kilocycle.

In addition to excellent wear characteristics, the disclosed photoconductors have color print stability and excellent cyclic stability of almost no or a minimal change in a generated known photoinduced discharge curve (PIDC), especially no or minimal residual potential cycle up after a number of charge/discharge cycles of the photoconductor, for example about 100 kilocycles, or xerographic prints of, for example, from about 80 to about 100 kiloprints. Color print stability refers, for example, to substantially no or minimal change in solid area density, especially in 60 percent halftone prints, and no or minimal random color variability from print to print after a number of xerographic prints, for example 50 kiloprints.

The following Examples are being submitted to illustrate embodiments of the present disclosure. Molecular weights were determined by Gel Permeation Chromatography analysis. The ratios recited were determined primarily by the amount of components selected for the preparations indicated.

EXAMPLE I

Preparation of Type I Titanyl Phthalocyanine

A Type I titanyl phthalocyanine (TiOPc) was prepared as follows. To a 300 milliliter three-necked flask fitted with mechanical stirrer, condenser and thermometer maintained under an argon atmosphere were added 3.6 grams (0.025 mole) of 1,3-diiminoisoindoline, 9.6 grams (0.075 mole) of o-phthalonitrile, 75 milliliters (80 weight percent) of tetrahydronaphthalene, and 7.11 grams (0.025 mole) of titanium tetrapropoxide (all obtained from Aldrich Chemical Company except phthalonitrile which was obtained from BASF). The resulting mixture (20 weight percent of solids) was stirred and warmed to reflux (about 198° C.) for 2 hours. The resultant black suspension was cooled to about 150° C., and then was filtered by suction through a 350 milliliter, M-porosity sintered glass funnel, which had been preheated with boiling dimethyl formamide (DMF). The solid Type I TiOPc product resulting was washed with two 150 milliliter portions of boiling DMF, and the filtrate, initially black, became a light blue-green color. Then the obtained solid was slurried in the funnel with 150 milliliters of boiling DMF, and the suspension was filtered. The resulting solid was washed in the funnel with 150 milliliters of DMF at 25° C., and then with 50 milliliters of methanol. There was obtained a shiny purple solid that was dried at 70° C. overnight, about 18 hours, to yield 10.9 grams (76 percent) of pigment, which were identified as Type I TiOPc on the basis of its X-ray powder diffraction trace. Elemental analysis of the product indicated C, 66.54; H, 2.60; N, 20.31; and Ash (TiO$_2$), 13.76. TiOPc requires (theory) C, 66.67; H, 2.80; N, 19.44; and Ash, 13.86.

The Type I titanyl phthalocyanine can also be prepared in 1 chloronaphthalene or N-methyl pyrrolidone as follows. A 250 milliliter three-necked flask fitted with mechanical stirrer, condenser and thermometer maintained under an atmosphere of argon was charged with 1,3-diiminoisoindolene (14.5 grams), titanium tetrabutoxide (8.5 grams), and 75 milliliters of 1-chloronaphthalene (ClNp) or N methyl pyrrolidone. The mixture was stirred and warmed. At 140° C. the mixture turned dark green and began to reflux. At this time, the vapor (which was identified as n-butanol by gas chromatography) was allowed to escape to the atmosphere until the reflux temperature reached 200° C. The reaction was maintained at this temperature for two hours, then was cooled to 150° C. Subsequently, the product obtained was filtered through a 150 milliliter M-porosity sintered glass funnel, which was preheated to approximately 150° C. with boiling DMF, and then washed thoroughly with three portions of 150 milliliters of boiling DMF, followed by washing with three portions of 150 milliliters of DMF at room temperature, and then three portions of 50 milliliters of methanol, thus providing 10.3 grams (72 percent yield) of a shiny purple pigment, which were identified as Type I TiOPc by X-ray powder diffraction (XRPD).

EXAMPLE II

Preparation of Type V Titanyl Phthalocyanine

Fifty grams of the above prepared TiOPc Type I were dissolved in 300 milliliters of a trifluoroacetic acid/methylene chloride (1/4, volume/volume) mixture for 1 hour in a 500 milliliter Erlenmeyer flask with a magnetic stirrer. At the same time, 2,600 milliliters of methanol/methylene chloride (1/1, volume/volume) quenching mixture were cooled with a dry ice bath for 1 hour in a 3,000 milliliter beaker with a magnetic stirrer, and the final temperature of the mixture was about −25° C. The resulting TiOPc solution was transferred to a 500 milliliter addition funnel with a pressure-equalization arm, and added into the cold quenching mixture over a period of 30 minutes. The mixture obtained was then allowed to stir for an additional 30 minutes, and subsequently hose vacuum filtered through a 2,000 milliliter Buchner funnel with fibrous glass frit of about 4 to about 8 millimeters in porosity. The pigment resulting was then well mixed with 1,500 milliliters of methanol in the funnel, and vacuum filtered. Then the obtained pigment was well mixed with 1,000 milliliters of hot water (>90° C.), and vacuum filtered in the funnel four times. The pigment was then well mixed with 1,500 milliliters of cold water, vacuum filtered in the funnel, and the final water filtrate was measured for conductivity, which was below 10 μS. The resulting wet cake contained approximately 50 weight percent of water. A small portion of the wet cake was dried at 65° C. under vacuum and a blue pigment was obtained. A representative sample of the resulting pigment, after quenching with methanol/methylene chloride, was identified by XRPD as Type Y titanyl phthalocyanine.

The remaining portion of the above wet cake was redispersed in 700 grams of monochlorobenzene (MCB) in a 1,000 milliliter bottle, and rolled for an hour. The resulting dispersion was vacuum filtered through a 2,000 milliliter Buchner funnel with a fibrous glass frit of about 4 to about 8 millimeters in porosity over a period of two hours. Then the obtained pigment was well mixed with 1,500 milliliters of methanol, filtered in the funnel twice, and then vacuum dried at 60° C. to 65° C. for two days. Approximately 45 grams of the pigment product was obtained. The XRPD of the resulting pigment was designated as a Type V titanyl phthalocyanine, and where this Type V had an X-ray diffraction pattern having characteristic diffraction peaks at a Bragg angle of 2Q±0.2° at about 9.0°, 9.6°, 24.0°, and 27.2°.

COMPARATIVE EXAMPLE 1

There was prepared a photoconductor with a biaxially oriented polyethylene naphthalate substrate (KALEDEX™ 2000) having a thickness of 3.5 mils, and thereover, a 0.02 micron thick titanium layer was coated on the biaxially oriented polyethylene naphthalate substrate (KALEDEX™ 2000). Subsequently, there was applied thereon, with a gravure applicator or an extrusion coater, a hole blocking layer solution containing 50 grams of 3-aminopropyl triethoxysilane (γ-APS), 41.2 grams of water, 15 grams of acetic acid, 684.8 grams of denatured alcohol, and 200 grams of heptane. This layer was then dried for about 1 minute at 120° C. in a forced air dryer. The resulting hole blocking layer had a dry thickness of 500 Angstroms. An adhesive layer was then deposited by applying a wet coating over the blocking layer, using a gravure applicator or an extrusion coater, and which adhesive coating contained 0.2 percent by weight based on the total weight of the solution of the copolyester adhesive (ARDEL D100™ available from Toyota Hsutsu Inc.) in a 60:30:10 volume ratio mixture of tetrahydrofuran/monochlorobenzene/methylene chloride. The adhesive layer was then dried for about 1 minute at 120° C. in the forced air dryer of the coater. The resulting adhesive layer had a dry thickness of 200 Angstroms.

A photogenerating layer, 0.2 micron in thickness, comprising the above Example II titanyl phthalocyanine Type V was deposited on the above adhesive layer. The photogenerating layer coating dispersion was prepared as follows. In a 120 milliliter (ml) amber bottle there was mixed 2.4 grams of titanyl phthalocyanine Type V pigment (TiOPc V) with 0.45 gram of the polymeric binder polycarbonate poly(4,4'-dihydroxy-diphenyl-1-1-cyclohexane) carbonate (PCZ-200) weight average molecular weight of 20,000, available from Mitsubishi Gas Chemical Corporation, and 44.65 grams of monochlorobenzene. Subsequently, three hundred (300) grams of 2 millimeter (mm) stainless steel shot were added to the resulting mixture, and then the amber bottle was rotated at 200 revolutions per minute (rpm) for 6 hours on a roll mill. The above prepared mill base (TiOPc V/PCZ-200, weight percent ratio of 84.2/15.8 in monochlorobenzene, about 6 weight percent solid) was collected, and further let down with the corresponding PCZ-200 polymer solution. For every 10 grams of the mill base, a solution of 0.41 gram of PCZ200 and 7.96 grams of monochlorobenzene was added and mixed on a shaker for half an hour before coating the photogenerating dispersion. The photogenerating layer was then extrusion coated, and dried at 120° C. for 1 minute.

Subsequently, a 29 micron thick charge transport layer was extrusion coated on top of the above photogenerating layer from a solution prepared by dissolving N,N'-diphenyl-N,N-bis(3-methylphenyl)-1,1'-biphenyl-4,4'-diamine (mTBD, 4 grams), and the polyarylatecarbonate copolymer obtained from Mitsubishi Gas Chemical Company, Inc. (MGC) and identified herein as PAC-C80BP20 of the following Example III formula/structure (4 grams), in methylene chloride (45 grams), followed by drying in an oven at about 120° C. for about 1 minute. The resulting charge transport layer polyarylatecarbonate PAC-C80BP20/mTBD weight percent ratio was 50/50.

EXAMPLE III

A photoconductor was prepared by repeating the process of Comparative Example 1 except that for the photogenerating layer the polymeric binder polycarbonate poly(4,4'-dihydroxy-diphenyl-1-1-cyclohexane) carbonate (PCZ-200) was replaced with 0.45 gram of the polyarylatecarbonate copolymer binder obtained from Mitsubishi Gas Chemical Company, Inc. (MGC), and identified herein as PAC-C80BP20 of the following formula/structure

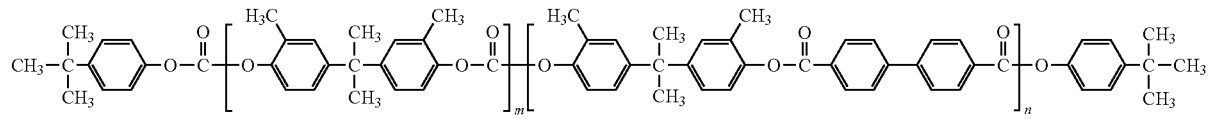

where m is 80 mol percent, n is 20 mol percent, and the total thereof is 100 mol percent, and the viscosity average molecular weight was 62,600 as provided by MGC, and which viscosity average molecular may be determined by known viscosity measurement processes. The resulting photogenerating layer contained 50 weight percent of the above polyarylatecarbonate and 50 weight percent of the titanyl phthalocyanine Type V photogenerating pigment.

EXAMPLE IV

A photoconductor is prepared by repeating the process of Example III except that the polyarylatecarbonate copolymer PAC-C80BP20 is replaced in both the photogenerating layer and in the charge transport layer with PAC-Z80BP20, obtained from Mitsubishi Gas Chemical Company, Inc., (MGC), and of the following formula/structure

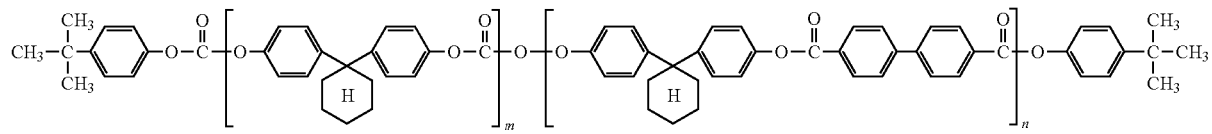

where m is 80 mol percent, n is 20 mol percent, and the total thereof is 100 mol percent, and the viscosity average molecular weight was 46,600 as provided by MGC, and which may be determined by known viscosity measurement processes.

EXAMPLE V

A photoconductor is prepared by repeating the process of Example III except that the polyarylatecarbonate copolymer PAC-C80BP20 is replaced in both the photogenerating layer, and in charge transport layer with PAC-A80BP20, obtained from Mitsubishi Gas Chemical Company, Inc., of the following formula/structure

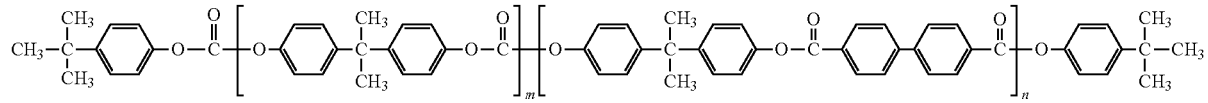

where m is 80 mol percent; n is 20 mol percent, and the total thereof is 100 mol percent, and the viscosity average molecular weight is 57,200 as provided by MGC, and which may be determined by known viscosity measurement processes.

Electrical Property Testing

The above prepared photoconductors of Comparative Example 1 and Example III were tested in a scanner set to obtain photoinduced discharge cycles, sequenced at one charge-erase cycle followed by one charge-expose-erase cycle, wherein the light intensity was incrementally increased with cycling to produce a series of photoinduced discharge characteristic curves from which the photosensitivity and surface potentials at various exposure intensities were measured. Additional electrical characteristics were obtained by a series of charge-erase cycles with incrementing surface potential to generate several voltages versus charge density curves. The scanner was equipped with a scorotron set to a constant voltage charging at various surface potentials. The above Comparative Example 1 and Example III photoconductors were tested at surface potentials of 500 volts with the exposure light intensity incrementally increased by means of regulating a series of neutral density filters, and the exposure light source was a 780 nanometer light emitting diode. The xerographic simulation was completed in an environmentally controlled light tight chamber at ambient conditions (40 percent relative humidity and 22° C.).

Both the above Comparative Example 1 and Example III photoconductors showed a high sensitivity of about a minus (−) 600 Vcm$^2$/erg. The disclosed Example III TiOPc/PAC-C80BP20 CG photoconductor showed about a 20 volt (V) less V$_r$ cycle up after 10,000 xerographic simulated imaging cycles than the Comparative Example 1 TiOPc/PCZ200 CG photoconductor.

At time zero (0) the Example III photoconductor (TiOPc/PAC-C80BP20), exhibited about 25V (volts) less dark decay than the Comparative Example 1 photoconductor (TiOPc/PCZ200). After 10,000 cycles in a simulated xerographic apparatus, the Example III photoconductor had about a 90 volt (V) less dark decay than the Comparative Example 1 photoconductor.

Less V$_r$ residual potential cycle up and lower dark decay are indications of improved electrical performances, thus improved imaging qualities, such as higher xerographic image resolution for the Example III photoconductor when compared with the Comparative Example 1 photoconductor.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A photoconductor comprising a supporting substrate, a photogenerating layer containing a polyarylatecarbonate and a charge transport layer comprised of a charge transport component and a polyarylatecarbonate, and wherein the polyarylatecarbonate for the photogenerating layer and the charge transport layer is a copolymer selected from the group consisting of those represented by the following formulas/structures

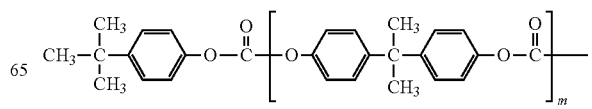

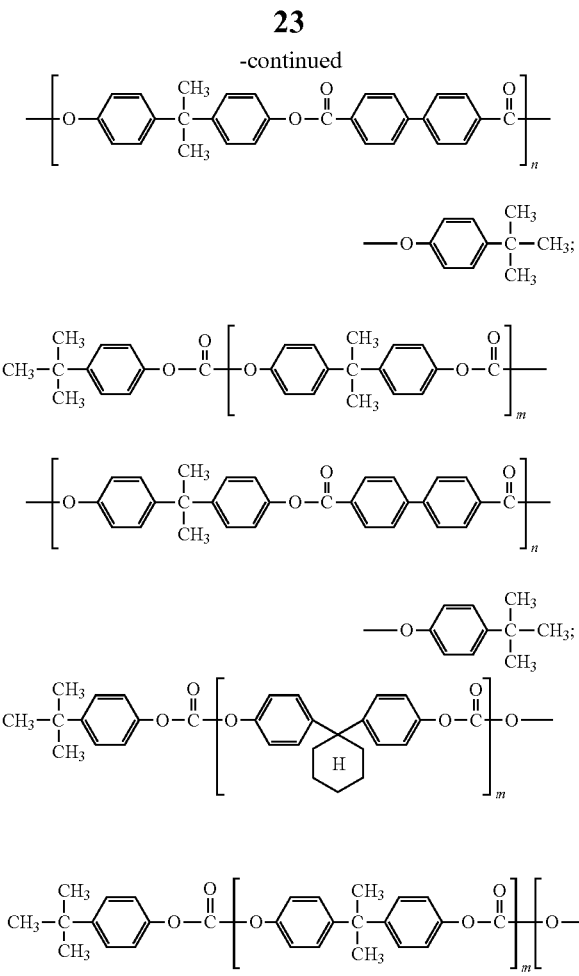

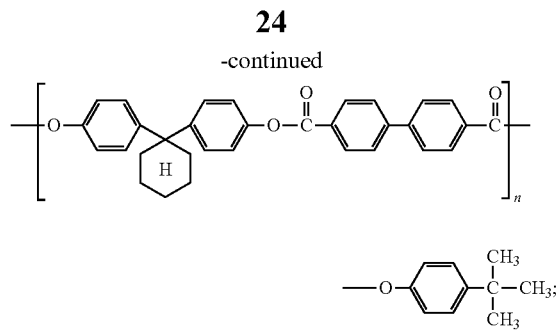

and mixtures thereof, wherein m and n represent the mol percents of each segment, wherein m is from about 60 to about 99 mol percent, and n is from about 1 to about 40 mol percent, and wherein the total thereof is about 100 mol percent.

2. A photoconductor in accordance with claim 1 wherein m is from about 60 to about 95 mol percent, and n is from about 5 to about 40 mol percent.

3. A photoconductor in accordance with claim 1 wherein m is from about 65 to about 85 mol percent, and n is from about 15 to about 35 mol percent.

4. A photoconductor in accordance with claim 1 wherein said copolymer is represented by the following formulas/structures

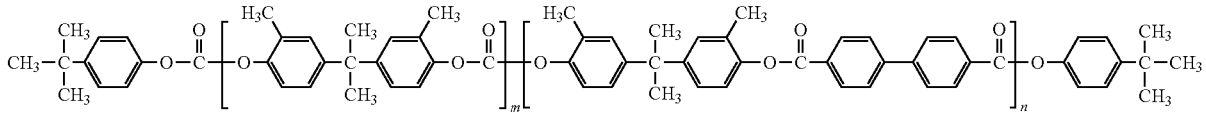

wherein m is from about 70 to about 90 mole percent, and n is from about 10 to about 30 mol percent.

5. A photoconductor in accordance with claim 1 wherein said copolymer is represented by the following formulas/structures wherein m is from about 70 to about 90 mole percent and n is from about 10 to about 30 mol percent.

6. A photoconductor in accordance with claim 1 wherein said copolymer is represented by the following formulas/structures

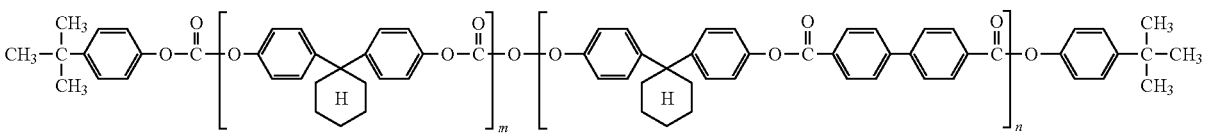

wherein m is from about 70 to about 90 mole percent and n is from about 10 to about 30 mol percent.

7. A photoconductor in accordance with claim 1 wherein said polyarylatecarbonate copolymer possesses a weight average molecular weight of from about 40,000 to about 70,000, and a number average molecular weight of from about 30,000 to about 60,000 as determined by GPC analysis.

8. A photoconductor in accordance with claim 1 wherein said polyarylatecarbonate copolymer is present in said photogenerating layer in an amount of from about 10 to about 80 weight percent of solids, and wherein said polyarylatecarbonate copolymer is present in the charge transport layer in an amount of from about 20 to about 70 weight percent of the solids.

9. A photoconductor in accordance with claim 1 wherein said polyarylatecarbonate copolymer is present in said photogenerating layer in an amount of from about 20 to about 70 weight percent and said polyarylatecarbonate copolymer is present in the charge transport layer in an amount of from about 30 to about 60 weight percent of the solids.

10. A photoconductor in accordance with claim 1 wherein said charge transport layer is comprised of a first charge transport layer in contact with said photogenerating layer, and a second charge transport layer in contact with said first charge transport layer, and wherein said polyarylatecarbonate copolymer is present in said second charge transport layer.

11. A photoconductor in accordance with claim 1 wherein said charge transport component is a compound as represented by at least one of nyl-4,4'-diamine, tetra-p-tolyl-biphenyl-4,4'-diamine, N,N'-diphenyl-N,N'-bis(4-methoxyphenyl)-1,1-biphenyl-4,4'-diamine, N,N'-bis(4-butylphenyl)-N,N'-di-p-tolyl-[p-terphenyl]-4,4'-diamine, N,N'-bis(4-butylphenyl)-N,N'-di-m-tolyl-[p-terphenyl]-4,4'-diamine, N,N'-bis(4-butylphenyl)-N,N'-di-o-tolyl-[p-terphenyl]-4,4'-diamine, N,N'-bis(4-butylphenyl)-N,N'-bis-(4-isopropylphenyl)-[p-terphenyl]-4,4'-diamine, N,N'-bis(4-butylphenyl)-N,N'-bis-(2-ethyl-6-methylphenyl)-[p-terphenyl]-4,4'-diamine, N,N'-bis(4-butylphenyl)-N,N'-bis-(2,5-dimethylphenyl)-[p-terphenyl]-4,4'-diamine, and N,N'-diphenyl-N,N'-bis(3-chlorophenyl)-[p-terphenyl]-4,4'-diamine.

13. A photoconductor in accordance with claim 1 wherein said photogenerating layer is comprised of at least one photogenerating pigment and said polyarylatecarbonate.

14. A photoconductor in accordance with claim 13 wherein said photogenerating pigment is Type V titanyl phthalocyanine.

15. A photoconductor in accordance with claim 1 wherein said photogenerating layer further includes at least one of a titanyl phthalocyanine, a hydroxygallium phthalocyanine, a halogallium phthalocyanine, a bisperylene, and mixtures thereof, and said polyarylatecarbonate.

16. A photoconductor comprised in sequence of a supporting substrate, an optional anticurl layer, an optional ground plane layer, a hole blocking layer thereover, an adhesive layer, a photogenerating layer comprising a mixture of a titanyl

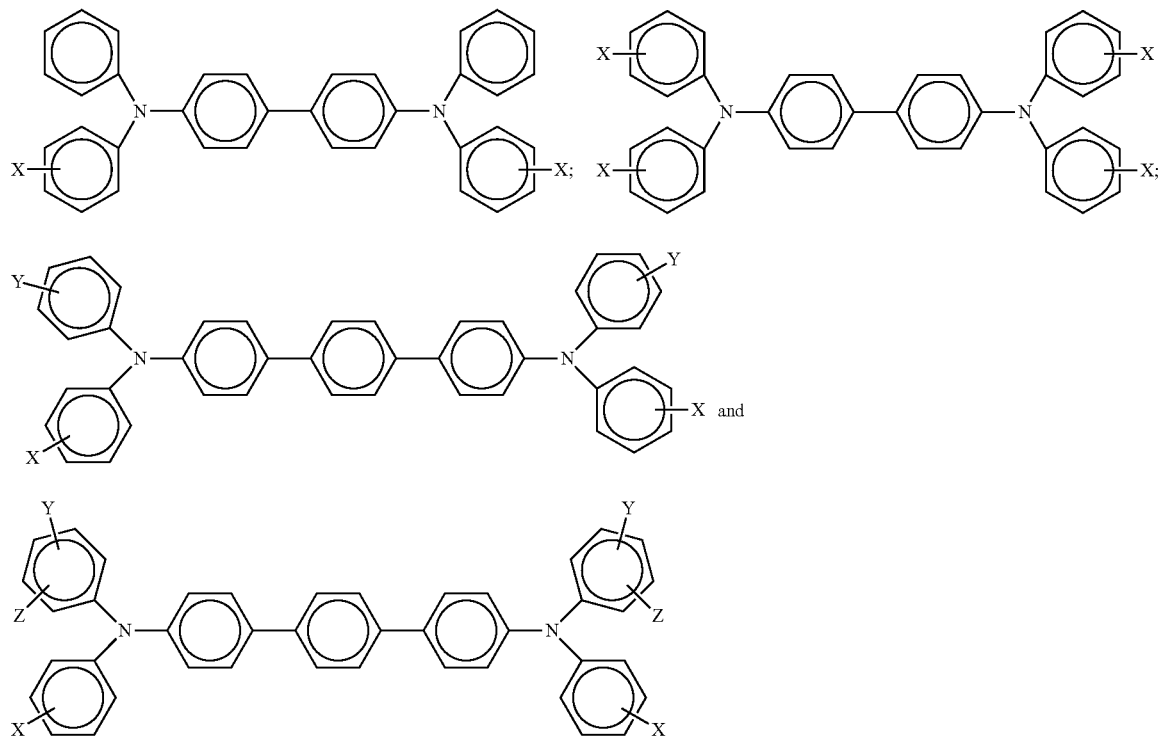

wherein X, Y, and Z are independently selected from the group consisting of alkyl, alkoxy, aryl, halogen, and mixtures thereof.

12. A photoconductor in accordance with claim 1 wherein said charge transport component is a compound selected from the group consisting of N,N'-bis(methylphenyl)-1,1-biphephthalocyanine photogenerating pigment and a polyarylatecarbonate as represented by the following formulas/structures, and a charge transport layer comprised of a mixture of an aryl amine hole transport compound and an optional polyarylatecarbonate as represented by the following formulas/structures

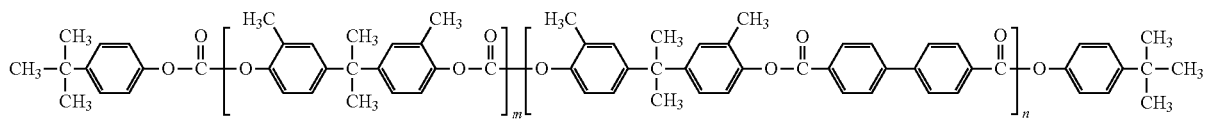

wherein m and n represent the mol percents of each segment, wherein said m is from about 75 to about 85 mol percent, and said n is from about 15 to about 25 mol percent, and wherein the total thereof is about 100 mol percent.

17. A photoconductor in accordance with claim 16 wherein said aryl amine hole transport compound is N,N'-diphenyl-N,N-bis(3-methylphenyl)-1,1'-biphenyl-4,4'-diamine.

18. A photoconductor in accordance with claim 16 wherein said adhesive layer is comprised of a polyester, said titanyl phthalocyanine pigment is Type V titanyl phthalocyanine, and said hole blocking layer is comprised of an aminosilane of at least one of 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, N-2-aminoethyl-3-aminopropyl tris(ethylethoxy)silane, p-aminophenyl trimethoxysilane, N,N'-dimethyl-3-aminopropyl triethoxysilane, 3-aminopropylmethyl diethoxysilane, 3-aminopropyl trimethoxysilane, N-methylaminopropyl triethoxysilane, methyl[2-(3-trimethoxysilylpropylamino)ethylamino]-3-proprionate, (N,N'-dimethyl 3-amino)propyl triethoxysilane, N,N-dimethylaminophenyl triethoxysilane, trimethoxysilyl propyldiethylene triamine, and mixtures thereof.

19. A photoconductor comprising a supporting substrate, a hole blocking layer thereover, an adhesive layer, a photogenerating layer comprised of a mixture of a titanyl phthalocyanine photogenerating pigment and a polyarylatecarbonate and a hole transport layer comprised of a mixture of a hole transport compound and a polyarylatecarbonate, and wherein the polyarylatecarbonate for the photogenerating layer and the charge transport layer is a copolymer selected from the group consisting of those represented by the following formulas/structures

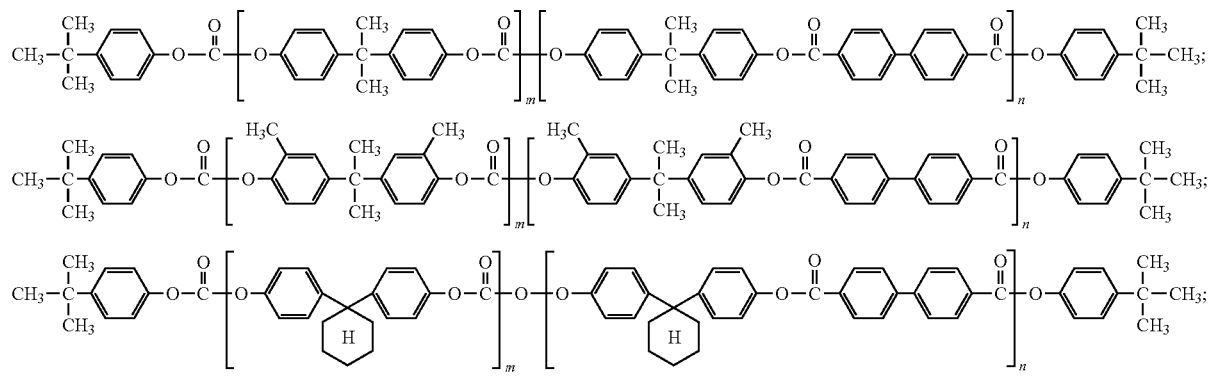

and mixtures thereof, wherein m and n represent the mol percents of each segment, wherein m is from about 60 to about 99 mol percent, and n is from about 1 to about 40 mol percent, and wherein the total thereof is about 100 mol percent.

20. A photoconductor in accordance with claim 19 wherein m is from about 65 to about 85 mol percent, and n is from about 15 to about 35 mol percent.

21. A photoconductor in accordance with claim 19 wherein said polyarylatecarbonate is a copolymer represented by the following formulas/structures

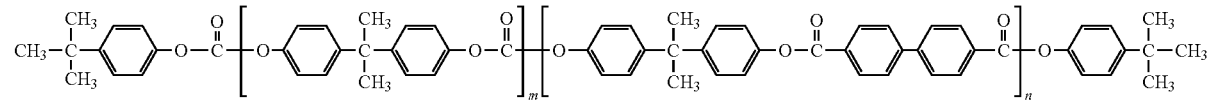

wherein m is about 80 mol percent and n is about 20 mol percent.

22. A photoconductor in accordance with claim 19 wherein said polyarylatecarbonate is a copolymer represented by the following formulas/structures

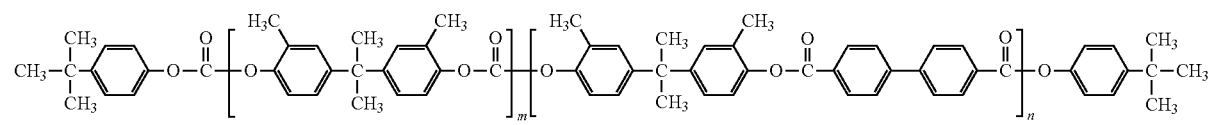
wherein m is about 80 mol percent and n is about 20 mol percent and said titanyl phthalocyanine photogenerating pigment is Type V titanyl phthalocyanine.
* * * * *